United States Patent [19]

Howland et al.

[11] 4,119,736
[45] Oct. 10, 1978

[54] METHOD FOR FIXING CRYOGENICALLY CONDENSED COFFEE AROMATICS IN A GLYCERIDE CARRIER

[75] Inventors: Robert Franklin Howland, New City, N.Y.; George Anthony Jasovsky, Bayonne, N.J.; Joseph Anthony Galanti, New Fairfield, Conn.

[73] Assignee: General Foods Corporation, White Plains, N.Y.

[21] Appl. No.: 643,432

[22] Filed: Dec. 22, 1975

[51] Int. Cl.² ............................................. A23F 1/12
[52] U.S. Cl. ................................. 426/386; 426/417; 426/594
[58] Field of Search ............... 426/386, 594, 417, 387; 55/189

[56] References Cited

U.S. PATENT DOCUMENTS

| | | | |
|---|---|---|---|
| 2,680,687 | 6/1950 | Lemonnier | 426/386 X |
| 3,021,218 | 2/1962 | Clinton et al. | 426/386 |
| 3,142,548 | 7/1964 | Krantz | 55/89 |
| 3,535,118 | 10/1970 | Klein et al. | 426/386 |
| 3,783,163 | 1/1974 | Patel | 426/386 X |
| 3,823,241 | 7/1974 | Patel et al. | 426/386 |
| 3,836,682 | 9/1974 | Yadlowsky | 426/386 |
| 3,939,291 | 2/1976 | Katz | 426/388 |

*Primary Examiner*—Robert Halper
*Attorney, Agent, or Firm*—Thomas R. Savoie; Bruno P. Struzzi

[57] ABSTRACT

A high level of aromatics are absorbed by coffee oil by placing a coffee aroma frost in an isolated vessel, raising the internal temperature and pressure, removing water from the pressurized vessel and thereafter introducing coffee oil into the pressurized vessel. The mixture is allowed to equilibrate for a period of time and is then slowly vented.

6 Claims, No Drawings

METHOD FOR FIXING CRYOGENICALLY CONDENSED COFFEE AROMATICS IN A GLYCERIDE CARRIER

BACKGROUND OF THE INVENTION

This invention is related to commonly-assigned U.S. patent application of Siedlecki et al., Ser. No. 471,631 now U.S. Pat. No. 4,007,921, filed May 20, 1974, entitled "Method for Fixing Coffee Grinder Gas," wherein is disclosed a method for transferring the aromatics from a condensed coffee aroma frost to a glyceride carrier. This application is hereby incorporated by reference. According to the Siedlecki et al. invention, an aroma-containing gas which has a high carbon dioxide content, such as grinder gas, is cryogenically condensed to a frost. The frost is then placed in a pressure vessel, in an amount more than sufficient to produce a saturated gas phase, together with a glyceride such as coffee oil, and heat is supplied to the vessel to produce an internal pressure of at least 700 p.s.i.g. and an internal temperature above the congeal point of the glyceride. The vessel is then slowly, preferably isothermally, depressurized, care being taken to prevent the temperature from dropping below the congeal point of the glyceride. The aromatized glyceride, which will contain an amount of emulsified water, is then removed from the vessel and centrifuged to lower or eliminate its water content. The "dry" aromatized glyceride is thereafter combined with soluble coffee solids.

It has been found that during the course of centrifuging the aromatized glyceride, significant amounts of aromatics are lost to the surrounding atmosphere and that additionally the aromatized oil will, unless an inert atmosphere is supplied, come into contact with oxygen. It would be desirable, in terms of labor, time and equipment costs, if the centrifugation step could be eliminated.

SUMMARY OF THE INVENTION

This invention is directed to fixing in a glyceride carrier the aromatics contained in an aroma-bearing gas which has a high (e.g., above 80% by weight) carbon dioxide centent, and which gas has been condensed as an aroma-bearing frost. This invention is particularly described in terms of coffee grinder gas, which is in excess of 90% by weight $CO_2$; however, it is to be understood that other aroma-bearing gases which have a high carbon dioxide content such as coffee percolator vent gas and coffee roaster gas, may likewise be employed and are considered to be within the scope of this invention.

Glycerides such as coffee oil, bland-tasting vegetable oils and triacetin have proven especially useful as aroma carriers; however, other oils and low melting point fats may also be used. It is desirable to maximize the amount of aromatics that are fixed in the glyceride carrier, since this would minimize aroma loss and would reduce the amount of the glyceride which would be incorporated with the soluble coffee product to obtain a desired amount of aromatization.

This invention describes a process wherein a quantity of an aroma-bearing carbon dioxide frost is placed in an empty pressure vessel and the vessel is then isolated and warmed to produce an internal temperature of about 70° F. or above. The quantity of frost placed in the vessel usually will be more than sufficient to create a saturated $CO_2$ gaseous phase within the vessel. The $CO_2$ frost will typically be obtained from a nitrogen-cooled, scraped-surface heat exchanger as disclosed in commonly-assigned copending patent application, Ser. No. 371,784, filed June 20, 1973. Heat to melt the frost will typically be supplied by means of a water bath or jacket.

As the temperature within the isolated vessel increases, a gaseous phase of increasing pressure is developed and as the temperature increases above about −69.9° F. (75.1 p.s.i.a.), the remaining condensed carbon dioxide is converted from a solid phase to a liquid phase. As the temperature of the vessel contents exceeds about 32° F. (506.2 p.s.i.a.), the water content of the frost will liquefy and settle to the bottom of the vessel. After the water component has liquefied and usually after the vessel contents have reached at least about 70° F. water is removed from the pressurized vessel through a suitable outlet. It will usually be desirable to then wait a short period for the contents of the vessel to again settle and to remove any residual water that might still be present.

After water has been removed from the pressurized vessel and while the vessel contents are at least about 70° F. (853.4 p.s.i.a.), a liquid glyceride is introduced into the vessel. Preferably the glyceride is sprayed into the saturated $CO_2$ phase within the vessel under a pressure at least 200 p.s.i. above the vessel pressure. After the oil has been introduced, the vessel is again isolated and the contents held for a time, usually at least 30 minutes, to allow the contents to settle. During this period the vessel content should be maintained above the congeal point of the glyceride and will normally be kept about room temperature (70° F.) or above. Since the glyceride is pumped into the pressurized vessel at a positive pressure in excess of 1050 p.s.i.a., the glyceride will be (unless cooled) at a somewhat elevated temperature; this will contribute to an increase in both the temperature and pressure within the vessel. It will be possible to permit the vessel contents to exceed the critical $CO_2$ temperature of 87.8° F., and thereby preclude the presence of liquid $CO_2$, during all or a portion of the time the glyceride is present in the vessel. Preferably the temperature within will be kept below about 95° F., and typically the vessel contents will be permitted to cool down to about 70° F. during the hold-up period. After suitable hold-up, the pressure within the vessel is slowly, preferably isothermally, vented. Slow pressure released is desirable in order to prevent the temperature of the vessel contents from dropping below the congeal point of the glyceride, as this might hinder absorption or retention of aromatics by the glyceride. During pressure release, aromatics contained in the escaping $CO_2$ vent gas may be condensed and refluxed through a partial overhead condenser and packed column or otherwise processed to reclaim or recycle vented aromatics.

The glyceride resulting from the above described process is found to contain a high level of aromatics and a moisture content sufficiently low that additional processing to remove excess water is not required. It will be necessary to store aromatized glyceride at refrigerated conditions, preferably −20° F. or below, and contact with oxygen should be minimized.

The aromatized glyceride may be combined with coffee solids either in the form of dry soluble coffee, such as by conventional spray plating or any of the techniques disclosed in U.S. Pat. No. 3,769,032 or with a liquid coffee or coffee-like extract, prior to drying the extract. The aromatized glyceride may be solidified, such as by freezing, and comminuted, such as by grinding, prior to being mixed with the soluble coffee powder, such as disclosed in copending commonly-assigned patent application, Ser. No. 252,757 now U.S. Pat. No. 4,044,167, filed May 12, 1972 or prior to being combined with a liquid coffee extract, such as disclosed in now abandoned commonly-assigned patent application, Ser. No. 252,778, filed May 12, 1972, a slushed coffee extract, such as disclosed in commonly-assigned U.S. Pat. No. 3,809,770, or a partially frozen slab of coffee extract, such as disclosed in commonly-assigned U.S. Pat. No. 3,809,766.

DETAILED DESCRIPTION OF THE INVENTION

The most readily available source of grinder gas may be obtained by enclosing or hooding coffee grinding equipment, such as the commercial Gump Grinders. The gases liberated from the ground coffee may be removed by a pump or rotary blower; additionally, when desired, a stream of inert, preferably moisture free, gas may be used to sweep gas from the coffee and to have the grinding operation take place in a substantially inert atmosphere. Such a process is described in U.S. Pat. No. 2,156,212 which describes a method of collecting gases evolved during roasting, but which can be equally applied to the collection of gases evolved during the grinding or cellular disruption of whole, freshly roasted coffee beans. If pumping is employed, it may be desirable to cool the gas ahead of the pump so that the heat added by pumping will not deteriorate the aromatics contained in the gas.

The chemical composition of the evolved gas is largely carbon dioxide together with water vapor and the characteristic aromatic constituents of roasted coffee. The amount of moisture in the gas may be lowered by the use of dry roasting conditions and low-moisture quenches or quenching mediums. The evolved gas is preferably passed through a first condenser where it is cooled to between 35° and 50° F. and where substantial quantities of water are removed. The relatively low-moisture gas is then fed to a condenser, such as a jacketed, vertically-mounted, scraped-wall exchanger, which is cooled by means of a liquid gas refrigerant.

Preferably the condenser is cooled by means of liquid nitrogen and the gas flow into the exchanger is maintained within the range of about 1 to 5 cubic feet per minute per square foot of heat exchange surface. The nitrogen gas that evolves from the cooling system is useful as an inert gas stream which might be used elsewhere in the soluble coffee process, such as sweeping grinder gas from the grinder or inert gas packaging of the soluble coffee product.

The aroma bearing gas is condensed into the form of a frost as it comes into contact with the heat transfer wall of the condenser. The frost is removed from the condenser wall and collected for combination with a glyceride carrier. The frost may be held for a short period at low, such as liquid nitrogen, temperatures without deteriorating; however, it is preferred to immediately combine the frost with a glyceride carrier in accordance with this invention. The glyceride, which preferably is coffee oil or a bland-tasting vegetable oil, such as cottonseed, corn or coconut oil, is combined with the frost at a level of about 0.5 to 6 grams of frost per gram of glyceride, preferably at about 1 to 4 gms. of frost per gm. of glyceride.

The process of this invention employs high pressure as a means to increase absorption of the volatile compounds present in an aroma-bearing carbon dioxide frost by a glyceride carrier. The process, which may be conducted as a simple batch operation in a suitable pressure vessel, or as a semi-continuous, multi-stage, countercurrent operation in a battery of pressure vessels, eliminates the need for laborious mixing of the frost and the glyceride. This mixing operation has proven to be troublesome in commercial operation, since contact between the condensed frost and the glyceride quickly congeals the glyceride thus making uniform mixing of the two components quite difficult.

According to this invention, contact between the grinder gas frost and the liquid glyceride phase occurs in a pressure vessel which is equipped with suitable means for draining or otherwise eliminating the bottom liquid layer from the pressurized vessel. This can be done by simply draining the liquid through a valve in the bottom of the vessel. It would also be possible to permit the pressure within the vessel to force the liquid out of a vertical withdrawal tube which passes from the bottom of the vessel through one of the vessel walls.

A sufficient amount of the grinder gas frost is added to the vessel to insure the presence of saturated $CO_2$ vapor phase and a $CO_2$ liquid phase. Heat is added to the contents of the vessel, such as by means of a 70° F. to 85° F. water jacket, to sublime the grinder gas frost and form a headspace pressure. At approximately −70° F. a solid $CO_2$ changes phase to liquid. The pressure corresponding to this phase change is about 75 p.s.i.a. At this condition, water as well as many of the organic aromatics present are in the solid state. The temperature of the vessel contents is raised to a point above 32° F., and preferably to about room temperature, at which condition the grinder gas aromatics will diffuse and establish an equilibrium among the gaseous $CO_2$, liquid $CO_2$ and water phases which are present within the pressure vessel. After the vessel contents have reached the desired temperature, and possibly after a short equilibration period of about ½ hour, essentially all the water is removed from the vessel. This can readily be accomplished by a single draining of the bottom water layer from within the pressurized vessel. It may be desirable to employ two or more successive drainings with a short, say ½ hour, hold-up or equilibration period between drains. It would, of course, be possible to separate any aromas from the removed water phase, such as by vacuum distillation, and to subsequently make use of these separated aromatics to aromatize a soluble coffee product.

After water is removed from the pressurized vessel and while the vessel contents are above the congeal point of the glyceride, a liquid glyceride is introduced into the pressurized vessel, preferably in accordance with the previously mentioned spraying procedure. It is within the scope of this invention either to introduce the desired amount of glyceride into an isolated pressurized vessel, to cycle the glyceride around a single pressurized vessel, or to introduce the oil into successive stages of a battery of pressurized vessels. It may be desirable to hold the vessel contents at a particular temperature above the congeal point of the glyceride in order to increase by an hour or more the contact time between the liquid glyceride and the aromatics. Agitation of the vessel contents, such as by means of an internal stirrer, may also be desirable in order to increase absorption of aromatics by the liquid glyceride phase. Aromatics will be distributed between the glyceride and gaseous $CO_2$ phase as well as any liquid $CO_2$ that may be present according to equilibrium partition conditions based on complex relationships between vapor pressures, solubilities, and chemical potentials.

After slow, preferably isothermal, pressure release from the vessel, the aromatized glyceride is removed from the vessel. This can be done by simply draining the glyceride through a valve in the bottom of the tank or by permitting residual pressure within the vessel to force the liquid glyceride through a vertical withdrawal tube. As previously mentioned, the vent gases may be condensed and refluxed; alternatively the vent gas may be recycled to the scraped-wall heat exchanger, contacted with a bed of $CO_2$ frost, or aroma-bearing $CO_2$ frost or passed through a batch of liquid glyceride.

The aromatized glyceride may be combined with soluble coffee powder or with coffee extract prior to drying the extract in accordance with any of the known prior art techniques or as disclosed in any of the previously enumerated patents and commonly-assigned patent applications. Typical levels of addition for the aromatized glyceride are 0.1 to 2% by weight glyceride based on the weight of soluble solids in the final product. The aromatized powder of this invention may constitute all or only a portion of the powder in the final product, as will be apparent to those skilled in the art.

The terms "coffee powder" and "coffee extract" used in the description of this invention is meant to include material containing in whole or in part coffee substitutes such as powders or extracts obtained in whole or in part from roasted cereals such as wheat, rye, barley and the like. One such item is the water extract and resulting dried powder of wheat, barley and molasses known as "Instant Postum".

This invention is further described but not limited by the following example:

EXAMPLE I

Coffee grinder gas which was evolved during grinding of freshly roasted coffee beans was passed through a water cooled condenser where about one pound of water per thousand cubic feet of gas is removed. The gas was then passed to a liquid nitrogen-cooled, scraped-wall heat exchanger where it was condensed and collected as a frost.

One hundred and fifty-two pounds of the frost was placed in an 8.5 cubic foot pressure vessel which was immersed in a 75° F. water bath. After about 4 hours, the vessel had attained an internal pressure of about 850 p.s.i.g. and a temperature of about 70° F. A valve located on the bottom of the vessel was then opened and water was drained until a white, frothy fluid was observed exiting the valve. After closing the valve, the vessel was held for about 30 minutes and the draining procedure was repeated.

Ninety-five pounds of coffee oil were then pumped at a pressure of about 1150 p.s.i.g. and sprayed into the top of the vessel. After the oil had been sprayed in, the mixture was held for 1 hour to allow the system to settle. A vent line was then opened and the $CO_2$ was vented through a small diameter capillary tube to permit nearly isothermal venting to atmospheric pressure over the course of about 4 hours. The aromatized glyceride was then drained from the vessel and stored at −20° F.

The resulting aromatized coffee oil was found to be both quantitatively and qualitatively superior, in terms of aroma content, to comparably obtained coffee oil wherein the frost and glyceride were simultaneously introduced into the pressure vessel and wherein water was removed from the aromatized oil by centrifugation in accordance with the process described in the aforementioned Siedlecki et al. application.

Having thus described the invention, what is claimed is:

1. A method for fixing cryogenically condensed coffee aromatics in a liquid glyceride comprising the steps of:
    (a) condensing as a frost a coffee aroma-containing gas which has a high carbon dioxide content,
    (b) placing the aroma-containing frost in a pressure vessel,
    (c) supplying heat to the contents of the vessel to produce an internal temperature in excess of 32° F. and a pressure above 506 p.s.i.a., allowing a liquid water phase to be formed and after this liquid water phase has settled to the bottom of the pressurized vessel,
    (d) removing essentially all water from said pressurized vessel, therafter
    (e) pumping into said pressurized vessel an amount of a liquid glyceride, said amount being about 1 gram per 0.5 to 6 grams of the aroma frost of step (a), and the internal temperature within the pressure vessel being above the congeal point of the glyceride,
    (f) thereafter, slowly releasing the pressure within the vessel so that the glyceride carrier is maintained in a liquid state, and then
    (g) removing the aromatized glyceride from the pressure vessel.

2. The method of claim 1 wherein the liquid glyceride is sprayed into the pressurized vessel.

3. The method of claim 2 wherein the internal temperature and pressure within the vessel is above about 70° F. and 853.4 p.s.i.a. respectively before the glyceride is sprayed.

4. The method of claim 3 wherein the pressure within the vessel is released isothermally.

5. The method of claim 2 wherein after the liquid glyceride is sprayed into the pressurized vessel and before pressure is released from the vessel the liquid glyceride is cycled around the pressurized vessel.

6. The method of claim 2 wherein the water is removed from the pressurized vessel through a valve located at the bottom of the vessel.

* * * * *